April 17, 1951     R. C. FORSNAS     2,549,188

FLUID FLOW CONTROL VALVE

Filed Nov. 10, 1945

Inventor
RAYMOND C. FORSNAS

By Richard Van Busum

Attorney

UNITED STATES PATENT OFFICE 2,549,188

FLUID FLOW CONTROL VALVE

Raymond C. Forsnas, Los Angeles, Calif.

Application November 10, 1945, Serial No. 627,824

3 Claims. (Cl. 137—139)

This invention relates to fluid flow control valves and is particularly directed to improvements in the controlling means for such valves that are termed automatic in operation.

One object of the present invention is to provide a valve of improved design and construction for efficiently controlling the flow of fluids.

Another object is the provision of a fluid flow control valve which is actuated by the pressure of fluid and is controlled either electrically or manually.

Still another object is to provide a fluid flow control valve which is actuated by the variation of the pressure of the fluid in an expandable chamber and to further provide electrically and/or manually operated means for controlling the pressure of said fluid in said expandable chamber.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Description

Figure 1:
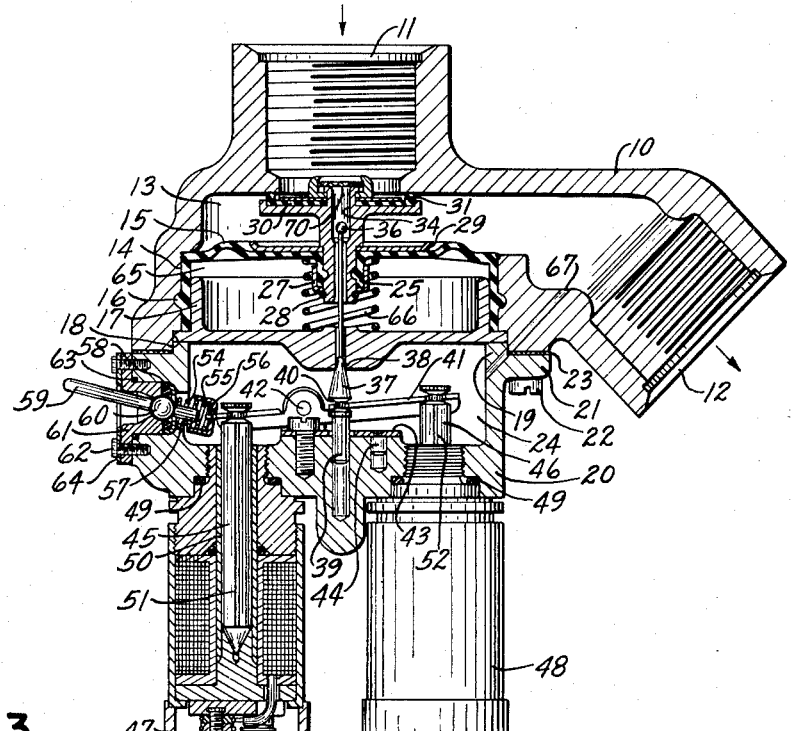
Fig. 1 is a cross-sectional view of the valve of this invention.

The present invention is directed to a novel valve for controlling the flow of fluid from a supply source to a demand source, said valve comprising a main body portion 10, formed of any suitable material (Figs. 1 and 2), with an extension having an inlet opening 11, and an extension having an outlet opening 12, said openings being threaded to receive pipe or tube connections for conducting fluid to and from the valve.

The inlet and outlet openings 11 and 12 connect with a chamber 13 formed in the hollow interior of the body 10. The chamber 13 has connecting therewith a bore 14 for receiving the outer circumference of an expandable diaphragm 15 made of suitable material, such as synthetic rubber, said diaphragm having, on its periphery, a circular rib 16, which engages a corresponding groove in the bore 14.

The diaphragm 15 is retained in the bore 14, and the rib 16 is retained in the groove in said bore, by a drum washer 17 having a flange which fits in a counterbore 18 in the body 10, said counterbore being concentric with the bore 14.

The drum washer 17 is retained in place by a tenon 19 on a valve cap 20 substantially round in shape and formed of the same material as the body 10, said tenon fitting snugly in the counterbore 18. The cap 20 has a flange 21 to receive screws 22 threaded into the body 10, to secure said cap to said body. A sealing washer 23, clamped between the face of the flange 21 and an adjacent face on the body 10, seals a cylindrical chamber 24, formed by the drum washer 17 and the cap 20, against the leakage of fluid.

Figure 3:
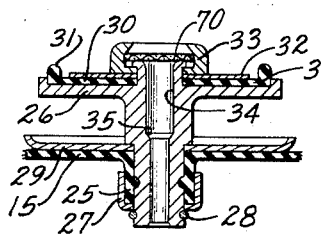
Fig. 3 is an enlarged sectional view of the main valve member for controlling the flow of fluid.

The diaphragm 15 has a downwardly extending neck 25 with a central hole through which extends a reduced portion of a hollow stem of a valve member 26 (Figs. 1 and 3), said stem having an annular groove which is engaged by a ring-shaped rib formed in the central hole of the neck 25. A ferrule 27 encircles the neck 25 to retain the rib in the groove and thereby secure the stem in the neck. An open ring 28 snaps into a groove in the valve stem, adjacent the ferrule 27, to secure said ferrule on the neck 25. A washer 29, with the edge cupped upwardly, is secured between the shoulder formed by the reduced portion of the valve stem and the upward face of the diaphragm 15 to strengthen and improve the thrust of said diaphragm.

The upper face of the valve member 26 is recessed or undercut to receive a valve washer 30 made of suitable material, such as synthetic rubber, and said washer has, formed upwardly from its periphery, a circular rib 31, which engages the upper flat surface of the chamber 13 to close the inlet opening 11 and thereby terminate the flow of fluid, as will be explained presently. Central holes in the valve washer 30, in an adjacent reinforcing washer 32, and in a cupped retaining washer 33 fit over a tenon formed on the upper end of the valve member 26, said tenon being spun over the edge of the hole in the washer 33 to secure the washers 30, 32, and 33 to the valve member 26.

The valve member 26 has a thorough bore 34 in the center of the stem, the upper portion of which bore is enlarged to form a valve seat 35 for a ball check 36 connected by a long pin to a pilot valve 37, which in turn cooperates with a seat 38 formed in the drum washer 17. The pilot valve has a guide tenon 39, which loosely engages a guide hole in the cap 20 for the purpose of maintaining said pilot valve in alinement with the seat 38.

The pilot valve 37 has an annular groove 40 engaged by a slot in an operating lever or teeter bar 41 pivoted on a stud 42 fast in an upturned ear of a bracket 43 secured by screws to a raised portion of the bottom interior surface of the cap 20. A pin 44 (Fig. 1), fast in the bracket 43, cooperates with a hole in the cap 20 to assist in properly locating said bracket and the lever 41 in relation to the pilot valve 37. A clearance hole in the bracket 43 encircles the tenon 39 of the valve 37.

The lever 41 (Fig. 1) has, in horizontal bent-over portions thereof, two similar slots which engage similar annular grooves in the upper ends of similar plungers or armatures 45 and 46 of solenoids 47 and 48 threaded into properly-spaced openings in the cap 20 and sealed against the leakage of fluid by washers 49 made of synthetic rubber or other suitable material. The plungers 45 and 46 are a slidable fit in corresponding sleeves 50 (only one shown here) sealed against fluid leakage in their corresponding solenoids 47 and 48. The plungers 45 and 46 (Fig. 1) have, respectively, slots 51 and 52 running the full length thereof, which permit the escape of any fluid trapped in the sleeves 50 and thereby insure proper operation of said plungers 45 and 46.

The solenoids 47 and 48 have, respectively, terminal caps 53 for the passage of terminal wires which connect the respective solenoids to any suitable source of electrical energy. A suitable control switch (not shown), interposed in the circuits to the solenoids 47 and 48, provides means for controlling the energization of said solenoids, which in turn rock the lever 41 up and down to control the operation of the pilot valve 37 (Fig. 1) in a manner to be described presently.

The lever 41 (Fig. 1) is assisted to and retained in either of its moved positions by a snap-action, off-center spring-actuated device comprising a compression spring 54, the inner end of which fits in a cap 55 slotted to receive a tongue 56 formed on the left end of the lever 41. The outer end of the spring 54 freely enters a boring 57 in the cap 20 and is compressed between the cap 55, the tongue 56, and a cup washer 58.

Manual operation of the lever 44 and the pilot valve 37 may be effected by a hand lever 59 having a tenon which extends through a clearance hole in the cup washer 58 and is encircled by the outer end of the spring 54. A pivot ball 60, formed on the lever 59, cooperates with a socket formed in a retaining bushing 61, which fits in a counterbore in the cap 20, concentric with the bore 57, and is secured in place by screws 62, which pass through holes in a flanged head of said bushing and are threaded into the cap 20. A sealing washer, made of suitable material, is compressed between the pivot ball 60 and the cupwasher 58 to seal the opening for the lever 59 against the leakage of fluid. A sealing washer 63, compressed between a recess in the counterbore and the flange of the bushing 61, seals said bushing against the leakage of fluid. An outward extension of the lever 59 extends through a guide slot in a plate 64 secured to the head of the bushing 61, said slot serving to restrict said lever 59 to an up-and-down movement, which is required for proper operation of the pilot valve 37.

Figure 2:
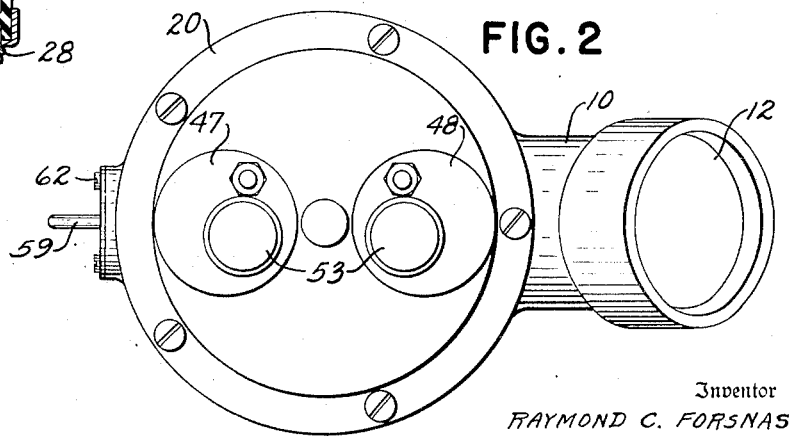
Fig. 2 is a plan view of the valve of this invention.

Considering the solenoid 47 as having been last energized to close the pilot valve 37 and to lift the ball 36 off the seat 35, as shown in Fig. 1, the flow of fluid from the chamber 13 through the orifice or bore 34 into a chamber 65, formed by the diaphragm 15 and the drum washer 17, equalizes the pressure in said chambers. Equalizing of the pressure in the chambers 13 and 65 permits a spring 66, loosely encircling the ferrule 27 and compressed between the diaphragm 15 and the drum washer 17, to assist the fluid in expanding said diaphragm to in turn force the flow control valve 26 upwardly to seat the rib 31 and thereby close the inlet opening 11 to terminate the flow of fluid through the valve.

To open the valve, the solenoid 48 (Fig. 1) is energized by proper operation of the control switch, whereupon downward movement of the plunger 52 rocks the lever 41 clockwise to open the pilot valve 37 and seat the ball 36. This closes the connecting orifice 34 between the chamber 65 and the chamber 13 and simultaneously opens said chamber 65 to the chamber 24, thus permitting the fluid in said chamber 65 to flow into said chamber 24 and thence through a bleeder hole 67 into the outlet side of the valve. This reduces the pressure in the chamber 65 to a point where the pressure of the fluid on the valve member 26 contracts the diaphragm 15 and overcomes the action of the spring 66 to move said valve member to open position to permit the fluid to flow through the chamber 13 and out the outlet opening 12. The fluid continues to flow until the pilot valve 37 is closed by energizing the solenoid 47.

The valve operates equally as well when the fluid flows by gravity as when it flows under pressure.

The hand lever 59 (Fig. 1) provides means for manually operating the pilot valve 37 to control the flow of fluid through the valve, in case it is necessary and/or desirable. Moving the lever 59 in either direction, through the spring 54, rocks the lever 41 in the opposite direction to control the pilot valve 37 in the manner explained above.

A screen 70 (Figs. 1 and 3), secured in the interior of the cupped washer 33, protects the pilot valve mechanism against the entrance of foreign matter.

While the form of mechanism shown and described herein is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a valve for controlling the flow of fluid from a supply source to a demand source, said valve comprising a main body portion having a hollow interior with fluid inlet and outlet openings therein, the combination of a valve member to close the inlet opening; a diaphragm mounted in the hollow interior and connected to the valve member, said diaphragm expandable to close the valve member and contractable to open the valve member; a part to retain the diaphragm in the hollow interior; a pressure chamber formed by the diaphragm and the part; a spring within the chamber and effective to urge the valve member to closed position; a fluid orifice in the valve member and connecting the chamber to the inlet opening; a discharge opening in the chamber, said opening in alinement with the orifice; seats formed in the orifice and the discharge opening; a valve element mounted in the orifice and the discharge opening and cooperating with the seats therein to open the orifice and to simultaneously close the discharge opening to increase the pressure in the chamber to a point where the combined effect of said pressure and the spring will overcome the pressure of the fluid at the inlet opening to expand the diaphragm and close the valve member, said valve element also effective to open the discharge opening and simultaneously close the orifice to reduce the pressure in the chamber to a point where the pressure of the fluid at the inlet opening against the valve member, combined with the reduced pressure in the chamber, will overcome the action of the spring to contract the diaphragm and open the valve member; a rockable part to actuate the valve element; electrical means coacting with the part to rock it to actuate the valve element to open and close the valve; and manual means coacting with the part to rock it to actuate the valve element to open and close the valve.

2. In a valve for automatically controlling the flow of fluid, said valve comprising a main body portion with a hollow interior having inlet and outlet openings connecting therewith, the combination of a diaphragm mounted in the hollow interior opposite the inlet opening; an element coacting with the diaphragm to retain it in the hollow interior and to form a pressure chamber; a main valve member mounted on the diaphragm and arranged to coact with the inlet opening to control the flow of fluid therethrough; yieldable means to urge the valve member to closed position; an orifice in the valve member to admit fluid from the inlet opening to the chamber, said orifice having a valve seat formed therein; a duct in the element to discharge fluid from the chamber, said duct being in alinement with the orifice and having a valve seat formed therein; an auxiliary valve member mounted in the orifice and the duct and coacting with the valve seats therein; and means operable to move the auxiliary valve member in one direction to close the discharge duct and to simultaneously open the orifice to equalize the pressure of the fluid inside and outside the pressure chamber to expand the diaphragm, to cause it to assist the yieldable means to engage the main valve member with the inlet opening to terminate the flow of fluid through the valve, said means also operable to move the auxiliary valve member in another direction to close the orifice and to simultaneously open the discharge duct to reduce the pressure of the fluid in the pressure chamber to cause the fluid in the inlet opening to overcome the action of the yieldable means to disengage the valve member from the inlet opening to initiate the flow of fluid through the valve.

3. In a pilot-controlled fluid valve, comprising a main body portion with a hollow interior having inlet and outlet openings connecting therewith, said inlet opening being inverted, said hollow interior including a cylindrical portion directly beneath the inlet opening, the combination of a flexible diaphragm mounted in the cylindrical portion; an element to retain the diaphragm in the cylindrical portion; a pressure chamber formed by the diaphragm and the element; a main valve seat formed on the lower face of the inlet opening; a main valve member mounted on the diaphragm directly beneath the inlet opening and constructed and arranged to engage the main valve seat to terminate the flow of fluid; a spring compressed between the diaphragm and the element and acting to normally expand the diaphragm and urge the main valve member into yielding engagement with the main valve seat; an orifice in the valve member to connect the inlet opening to the pressure chamber; a pressure chamber discharge duct in the element, said duct in alinement with the orifice; pilot valve seats formed in the orifice and the discharge duct; a pilot valve member mounted for operation in the orifice and the discharge duct and having enlarged portions coacting with the pilot valve seats, said pilot valve member having two positions of adjustment and effective when in one position of adjustment to close the discharge duct and simultaneously open the orifice to admit fluid to the chamber to equalize the pressure therein with the pressure of the fluid at the inlet opening to cause the spring to close the main valve, said pilot valve member effective when in its other position of adjustment to close the orifice and open the discharge duct to decrease the pressure in said chamber to the point where the pressure of the fluid on the main valve member will overcome the action of the spring and open said main valve member; and means to selectively move the pilot valve member to either of its positions of adjustment.

RAYMOND C. FORSNAS.

REFERENCES CITED

The following references are of record in the file of this patent:

UNITED STATES PATENTS

| Number | Name | Date |
|---|---|---|
| 245,476 | Fried | Aug. 9, 1881 |
| 493,774 | Howes | Mar. 21, 1893 |
| 620,829 | Batchelor | Mar. 7, 1899 |
| 912,384 | Kimball | Feb. 16, 1909 |
| 2,180,320 | Hansen | Nov. 14, 1939 |
| 2,235,304 | Toussaint | Mar. 18, 1941 |
| 2,292,477 | Ray | Aug. 11, 1942 |

FOREIGN PATENTS

| Number | Country | Date |
|---|---|---|
| 756,403 | France | Sept. 25, 1933 |